United States Patent
Darshan et al.

(10) Patent No.: US 7,106,749 B1
(45) Date of Patent: Sep. 12, 2006

(54) SYSTEM FOR DATA STREAM PROCESSING

(75) Inventors: Ezra Darshan, Jerusalem (IL); Moshe Shlissel, Jerusalem (IL); Reuven Wachtfogel, Jerusalem (IL)

(73) Assignee: NDS Limited, West Drayton (GB)

( * ) Notice: Subject to any disclaimer, the term of this patent is extended or adjusted under 35 U.S.C. 154(b) by 0 days.

(21) Appl. No.: 09/574,096

(22) Filed: May 18, 2000

(30) Foreign Application Priority Data

Nov. 10, 1999 (IL) .................................... 132859

(51) Int. Cl.
*H04L 12/28* (2006.01)
*H04L 12/56* (2006.01)

(52) U.S. Cl. ................. 370/395.64; 370/486; 370/535; 386/33; 386/35; 386/40; 386/68; 386/109; 725/89; 725/102

(58) Field of Classification Search ........... 370/392, 370/535, 395.64; 386/33, 46, 35, 40, 98, 386/68, 70, 95, 109, 125, 126; 348/13.14, 348/571; 375/240.26, 240.01; 725/86–104
See application file for complete search history.

(56) References Cited

U.S. PATENT DOCUMENTS

| | | | |
|---|---|---|---|
| 5,282,249 A | 1/1994 | Cohen et al. | |
| 5,414,455 A | 5/1995 | Hooper et al. | |
| 5,455,684 A | 10/1995 | Fujinami et al. | 358/335 |
| 5,481,609 A | 1/1996 | Cohen et al. | |
| 5,550,643 A | 8/1996 | Azadegan | |
| 5,559,608 A | 9/1996 | Kunihiro | |
| 5,630,005 A | 5/1997 | Ort | |
| 5,737,479 A | 4/1998 | Fujinami | |
| 5,742,681 A * | 4/1998 | Giachetti et al. | 380/212 |
| 5,798,995 A | 8/1998 | Fukushima et al. | |
| 5,900,904 A | 5/1999 | Okada et al. | |
| 5,973,679 A | 10/1999 | Abbott et al. | |
| 6,026,232 A | 2/2000 | Yogeshwar et al. | |
| 6,178,242 B1 | 1/2001 | Tsuria | 380/201 |
| 6,453,115 B1 | 9/2002 | Boyle | 386/68 |
| 6,512,882 B1 | 1/2003 | Teunissen | |
| 6,931,198 B1 * | 8/2005 | Hamada et al. | 386/46 |
| 2004/0004977 A1 * | 1/2004 | Robbins et al. | 370/535 |
| 2004/0170390 A1 * | 9/2004 | Kim et al. | 386/95 |

FOREIGN PATENT DOCUMENTS

| | | |
|---|---|---|
| EP | 0 712 127 A2 | 5/1996 |
| EP | 0712127 A2 | 5/1996 |
| EP | 0 718 980 | 6/1996 |
| EP | 0 964 578 B1 | 7/1996 |

(Continued)

OTHER PUBLICATIONS

Webpage: http://www.winternet.com/~gginc/ftp/isf110.txt, Oct. 4, 1999, pp. 1-5.

(Continued)

*Primary Examiner*—John Pezzlo
*Assistant Examiner*—Inder Pal Mehra
(74) *Attorney, Agent, or Firm*—Darby & Darby

(57) ABSTRACT

A method for processing a data stream including receiving a transport stream (TS), storing at least a portion of the TS, the at least a portion of the TS having a beginning and including a plurality of TS packets, determining, from among the plurality of TS packets, at least one TS packet including a candidate access point, storing in an index store a byte offset of the candidate access point; and storing in the index store a plurality of indications of byte offset, each byte offset being associated with an arrival time of a received TS packet.

20 Claims, 3 Drawing Sheets

FOREIGN PATENT DOCUMENTS

| | | |
|---|---|---|
| EP | 0 786 909 A2 | 1/1997 |
| EP | 1 089 565 A2 | 9/2000 |
| JP | 60253026 A2 | 12/1985 |
| JP | 03058131 A2 | 3/1991 |
| JP | 04087074 A2 | 3/1992 |
| JP | 04101244 A2 | 4/1992 |
| JP | 04159662 A2 | 6/1992 |
| JP | 06060120 A2 | 3/1994 |
| JP | 06302112 A2 | 10/1994 |
| JP | 07250331 A2 | 9/1995 |
| JP | 08336111 A2 | 12/1996 |
| JP | 09330257 A2 | 12/1997 |
| WO | WO 99/62251 | 12/1999 |
| WO | WO-99/62251 A2 | 12/1999 |
| WO | 00/01149 | 1/2000 |
| WO | WO 99/62251 | 1/2000 |
| WO | WO-01/35669 A1 | 5/2001 |

OTHER PUBLICATIONS

ISAM—AOL Computing's Webopaedia Definition and Links, (http://aol.pcwebopedia.com/TERM/I/ISAM.html), Oct. 4, 1999, p. 1.

The Stony Brook Video Server—Implementation and Analysis of Fast Forward/Rewind for MPEG (http://www.ecsl.cs.sunysb.edu/~vernick/ffwd.html), pp. 1-5.

Taylor, Jim; *DVD Demystified The Guidebook for DVD-Video and DVD-ROM*, McGraw-Hill, 1998, pp. 72 and 195.

SMPTE Standard for Television—Splice Points for MPEG-2 Transport Streams, SMPTE 312M, 1999, pp. 1-20.

Syntax of a transmitted digital multimedia or other data signal, ISO/IEc 13818-1: 1994(E), pp. 22 and 121.

Digital Video Broadcasting (DVB); DVB SimulCrypt; Part 1: Head-end architecture and synchronization; TS 1-1 197-1 V1.1.1 (Jun. 1997).

ETSI Technical Report—"Digital Video Broadcasting (DVB); Support for use of scrambling and Conditional Access (CA) within digital broadcasting systems"; ETR 289, Oct. 1996.

MPEG-2 Standard; "Information technology—Generic coding of moving pictures and associated audio information: Video", ISO/IEC 13818-2:1996(E).

MPEG-2 Standard; "Information technology—Generic coding of moving pictures and associated audio information—Part 6: Extensions for DSM-CC", ISO/IEC 13818-6:1998(E).

"Exact Random Access of Motion Picture Experts Group Files", IBM Technical Disclosure Bulletin, vol. 38:12, pp. 329-330, Dec. 1995.

*"Exact Random Access of Motion Picture Experts Group Files";* IBM Technical Disclosure Bulletin, vol. 38, No. No. 12, Dec. 1995.

Patent Abstracts of Japan; vol. 1998, No. 10, Aug. 31, 1998 & JP 10 145773 A (Toshiba Corp), May 29, 1998 *abstract* & US 6 021 199 A (Ishibashi Yasuhiro) Feb. 1, 2000.

International Organisation for Standardisation: "Generic Coding of Moving Pictures and Associated Audio: Systems, Recommendation H.222.0, IS0/IEC 13818-1, International Standard", ISO/IEC JTC1/SC29/WG11 N0801, XX, XX, pp. 1-161 XP 002200170.

"Exact Random Access of Motion Picture Experts Group Files" IBM Technical Disclosure Bulletin, IBM Corp. New York, US. vol. 38, No. 12, Dec. 1, 1995, pp. 329-330, XP000588159.

Website: http://groups.google.com/groups?hl=en&lr=&ie=UTF-8&oe=UTF-8&selm=5jqnbm%2411j%40bmerhc5e.bnr.ca, Apr. 25, 1997.

DVB Subtitling FAQ, Softel Ltd., 2001.

Darshan et al., U.S. Appl. No. 10/479,373, "System For Random Access To Content", filed Dec. 1, 2003, (National stage of PCT/IL02/00534).

* cited by examiner

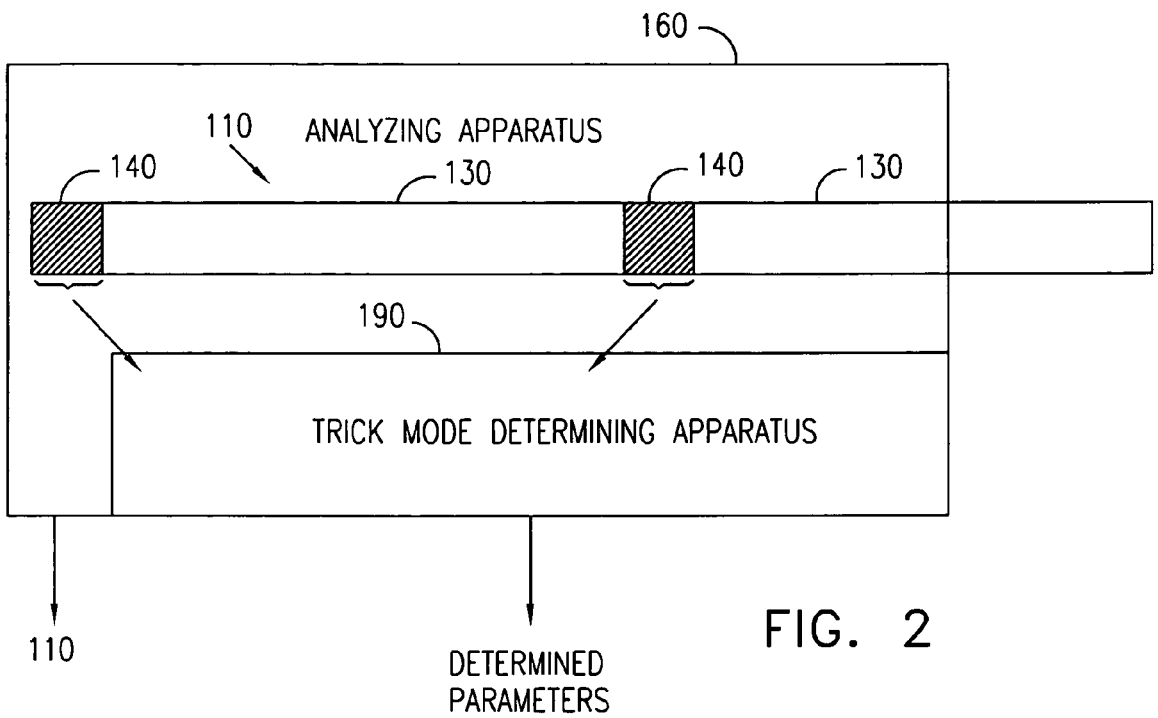
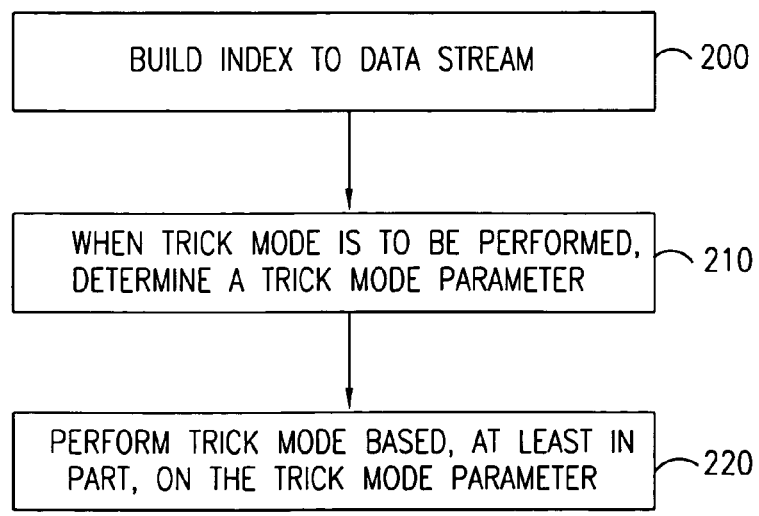

SYSTEM FOR DATA STREAM PROCESSING

FIELD OF THE INVENTION

The present invention relates to apparatus and methods for processing coded and/or scrambled data streams in general, and in particular to apparatus and methods for processing coded and/or scrambled data streams intended for storage and later playback.

BACKGROUND OF THE INVENTION

Scrambled data streams are well known in the art. There are many types of known scrambled data streams, of which scrambled video streams are in particularly common use.

Scrambled video streams are widely used in conditional access systems. In conditional access systems, as is well known in the art, content, such as video content, is scrambled, and information necessary to decrypt the content is made available only to authorized users. Conditional access systems are particularly well known in the field of television, although conditional access systems are also used as appropriate in other fields.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for making a data stream unintelligible except to an intended recipient thereof.

The term "encoded" is used throughout the present specification and claims, in all its grammatical forms, to refer to any type of data stream encoding including, for example and without limiting the scope of the definition, well known types of encoding such as MPEG-2 encoding. It is appreciated that an encoded data stream is generally more difficult to read, in the sense that more processing and typically more time are required to read an encoded data stream, than a data stream which is not encoded.

The term "complex data stream" is used throughout the present specification and claims to refer to a data stream which is scrambled and/or encoded.

Systems for scrambling television signals, and controlling access thereto, are well known in the art. One such system is described in the following U.S. Pat. No. 5,282,249 to Cohen et al.; and U.S. Pat. No. 5,481,609 to Cohen et al. Scrambled television data streams described in the Cohen et al. patents comprise both scrambled data representing television signals and coded control messages, also known as ECMs. The ECMs of Cohen et al comprise, in a coded form, data necessary for generating a control word (CW) which may be used to descramble the scrambled data representing television signals.

While the two patents to Cohen et al. describe an analog system, that is, a system in which analog television data streams are broadcast to television sets, it is appreciated that similar ECM methods may also be used for digital television data streams. Generally, the scrambling techniques used for scrambling analog television signals such as, for example, the well known "cut-and-rotate" technique, are chosen for their applicability to analog signals. In scrambling of digital television signals other scrambling techniques, well-known in the art, are used, the techniques being more appropriate to digital signals such as, for example, applying the well-known DES algorithm to the digital television signals.

It is also known in the art to apply methods analogous to those used for television scrambling to data scrambling, particularly in the case of digital methods.

A general discussion of some existing data stream playback systems and their drawbacks is found in:

Jim Taylor, *DVD Demystified: The Guidebook for DVD-Video and DVD-ROM*, McGraw-Hill, 1998, pages 72 and 195.

The following documents from the MPEG-2 standard describe syntax and methods which may be relevant to understanding the present invention:

syntax of a transmitted digital multimedia or other data signal: ISO/IEC 13818-1;

syntax of an encoded digital video signal: ISO/IEC 13818-2;

other methods: ISO/IEC 13818-6.

Other methods relevant to conditional access techniques employing ECMs are described in the following documents:

ETR 289, "Digital Video Broadcasting (DVB): Support for use of scrambling and Conditional Access (CA) within DVB systems";

TS 101 197-1 V1.1.1 (1997-06): "Digital Video Broadcasting (DVB): DVB SimulCrypt; Part 1: Head-end architecture and synchronization"; and DVB document TM-1244, revision 3.

Society of Motion Picture and Television Engineers (SMPTE) document 312M, "Splice points for MPEG-2 Transport Streams", describes "splice points" in MPEG-2 transport streams, which are inserted by a headend to facilitate smooth splicing between steams. Appendix A.6 of SMPTE 312M refers to encrypted streams.

It is well-known in the prior art for known forms of ECM processing, including creating and interpreting an ECM, to take place in a removable security element such as an IC card, commonly known as a smart card.

The disclosures of the following patent applications, assigned to NDS Limited, describe technologies which may be related to the present invention:

1. Israel Patent Application 125141, filed 19 Jun. 1998 and entitled "Advanced Television System", describes an example of a television system with which the present invention, in preferred embodiments thereof, may be useful. A corresponding PCT International Application claiming priority from Israel Application 125141 was published on 6 Jan. 2000 as WO 00/01149.

2. Israel Patent Application 120174, filed 7 Feb. 1997 and entitled "Digital Recording Protection System", describes a digital recording system which may be useful in conjunction with the present invention. A corresponding European Patent Application claiming priority from Israel Application 120174 was published on 28 Dec. 1998 as EP 0 858 184 A2.

Methods for providing fast forward/rewind in MPEG are described in an article on the World Wide Web written by Michael Vernick at URL http://www.ecsl.cs.sunysb.edu/~vernick/ffwd.html, entitled "The Stony Brook Video Server, Implementation and Analysis of Fast Forward/Rewind for MPEG."

It is further known in the art of data processing to add indexing information to a non-indexed file without changing the basic structure of the non-indexed file. Such files, after indexing, are generally known in the art as ISAM files.

The disclosures of all references mentioned above and throughout the present specification are hereby incorporated herein by reference.

SUMMARY OF THE INVENTION

The present invention seeks to provide improved apparatus and methods for processing scrambled data streams, the apparatus and methods being particularly suited for a case in which a scrambled data stream, delivered to a user via broadcast or by any other appropriate means, is recorded for later use. In one prevalent conditional access paradigm to which the present invention, in a preferred embodiment thereof, is particularly applicable, a recorded stream as described above is recorded in its scrambled state. That is, descrambling takes place only at the time of playback. The reasons for descrambling only at the time of playback are many; some of the principal reasons include the following:

generally to minimize the likelihood of unauthorized access;

in a case where access authorization may change between the time of recording and the time of playback, to apply the authorization which is correct at the time of playback; and to implement evolutionary change from previous systems that do not include recording by continuing to descramble only from the time of playback.

In the present invention, a data stream, except as otherwise indicated, refers to a data stream received from a source, preferably in a streaming mode; that is, the data stream received from the source is intended for playback in real time at the time of reception, although recording the data stream may be, and preferably is, allowed. It will be appreciated by persons skilled in the art that practical limitations on buffer size at the receiver of the stream as well as the requirement to be able to play the stream back in real time at the time of reception constrain the source to send the stream in such a way that the arrival time of a given bit of the stream is highly correlated with the presentation time at which that bit is presented to a user or has an effect on what is presented to the user. In the case of the MPEG-2 system, which is well known in the art, the inventors of the present application have determined that the presentation time of a bit and the arrival time of a bit generally differ by no more than a short time such as, for example, approximately 0.5 seconds. The close correlation between arrival time and presentation time may be used, in a preferred embodiment of the present invention, as a basic assumption that assists in the operation of the invention.

When playback is carried out at normal speed, a straightforward approach, which may be similar to prior art approaches for descrambling a broadcast scrambled data stream without recording, can succeed in efficiently descrambling the recorded scrambled data stream for playback. However, when special modes of playback, termed herein "trick modes", are used, difficulties may arise in locating an appropriate location in the scrambled data stream which is to be played back, due to the fact that the stream is at least partially scrambled and it may be difficult to traverse and descramble the stream in other than playback mode at normal speed. Trick modes include, but are not limited to, one or more of the following: fast forward; slow motion forward; fast reverse; slow motion reverse; freeze frame; and random access. The term "random access" is used herein to refer both to random access to any particular point and to access to a specific predefined location or event, such as a next location or event, in a data stream.

In preferred embodiments, the apparatus and methods of the present invention are believed to be well-suited for use with trick modes, but use of the present invention is not limited to trick modes.

Preferably, but not necessarily, trick modes include playback, such that "fast forward", for example, refers to fast forward with playback during the fast forward. In a preferred embodiment, the present invention determines a parameter of a trick mode, such as a location in a complex data stream such as, for example, a scrambled data stream or an encoded data stream, at which descrambling and playback are to begin, without descrambling the scrambled data stream at the time of determining the parameter. In an alternative preferred embodiment, any playback mode parameter or any data parameter relating to the data stream may be similarly determined, in addition to or instead of a trick mode. In some cases, the location may be determined heuristically. The location may comprise an access point, at which it is convenient, for technical reasons, to begin playback. The location may alternatively comprise a likely location of an access point, from which an access point can generally be found more easily than from a random location.

In a preferred embodiment, a location such as an access point may be found by examining components, such as control components, of the scrambled data stream which are themselves not scrambled. Such control components are commonly present and are found, for example, in the widely-used MPEG-2 type data stream. Furthermore, it is appreciated that a plurality of such access points may be located, and an index to the location of the access points in the scrambled data stream may be built to ease future access thereto.

It is also appreciated that a correspondence between arrival time and byte offset may not necessarily be linear. It may therefore not be possible to linearly map the contents of a scrambled data stream, such as an MPEG-2 type data stream, from byte offset in the data stream to a playback-related time coordinate. In other words, it may be difficult to find a byte offset in the scrambled data stream which corresponds to, for example, 5 minutes and 30 seconds into the stream when played back. The non-linearity of the mapping may be due to technical features of the scrambled data stream, including encoding artifacts and statistical multiplexing. The apparatus and methods of the present invention may also be helpful in providing such a mapping.

There is thus provided in accordance with a preferred embodiment of the present invention a method for processing a data stream including receiving a transport stream (TS), storing at least a portion of the TS, the at least a portion of the TS having a beginning and including a plurality of TS packets, determining, from among the plurality of TS packets, at least one TS packet including a candidate access point, storing in an index store a byte offset of the candidate access point, and storing in the index store a plurality of indications of byte offset, each byte offset being associated with an arrival time of a received TS packet.

Further in accordance with a preferred embodiment of the present invention the storing indications of byte offset step includes repeatedly storing in the index store, at predefined intervals of time, a byte offset of a recently received TS packet.

Further in accordance with a preferred embodiment of the present invention the byte offset of the candidate access point and the byte offset of the recently received TS packet each includes a byte offset relative to the beginning.

Still further in accordance with a preferred embodiment of the present invention the TS includes an MPEG-2 TS.

Additionally in accordance with a preferred embodiment of the present invention the TS includes an at least partially scrambled TS.

Moreover in accordance with a preferred embodiment of the present invention the TS includes a video stream.

Further in accordance with a preferred embodiment of the present invention the TS includes an audio stream.

Still further in accordance with a preferred embodiment of the present invention the method also includes utilizing the index for accessing at least a part of the portion of the TS.

Additionally in accordance with a preferred embodiment of the present invention the utilizing step includes determining a desired presentation time of a point to be accessed, the point being associated with the at least a part of the portion of the TS, determining an arrival time associated with the desired presentation time, and determining, based at least in part on at least one byte offset stored in the index store, a byte offset of an access point closely temporally associated with the arrival time.

Moreover in accordance with a preferred embodiment of the present invention the determining a desired presentation time includes determining a desired presentation time based on at least one of the following: at least one desired characteristic of a presentation mode, and at least one random access characteristic.

Further in accordance with a preferred embodiment of the present invention the determining an arrival time includes determining an arrival time based on the desired presentation time and on a predetermined relationship between arrival time and presentation time.

Still further in accordance with a preferred embodiment of the present invention the utilizing step also includes decoding the at least a part of the portion of the TS for presentation beginning from the access point.

Still further in accordance with a preferred embodiment of the present invention the utilizing step also includes descrambling the at least a part of the portion of the TS for presentation beginning from the access point.

Additionally in accordance with a preferred embodiment of the present invention the access point includes a packet including at least one of the following: a packet having a bit turned on in a standard TS header field, an ECM, an EMM, an Adaptation Field (AF) field, a private data field within the AF, an SI private table, a private descriptor, a private stream, and a visible field in a partially scrambled stream.

Further in accordance with a preferred embodiment of the present invention the private stream includes a private PES stream with associated PTS.

Still further in accordance with a preferred embodiment of the present invention the packet having a bit turned on includes a packet having a payload_unit_start_indicator (pusi) bit turned on.

Additionally in accordance with a preferred embodiment of the present invention the AF includes at least one of the following: a PCR, and a random access indicator.

There is also provided in accordance with another preferred embodiment of the present invention a method for processing a data stream including determining a desired presentation time of a point in the data stream to be accessed, determining an arrival time associated with the desired presentation time, and determining a position of an access point closely temporally associated with the arrival time.

There is also provided in accordance with still another preferred embodiment of the present invention a method for analyzing a data stream including receiving an MPEG data stream including a transport stream (TS), the TS including a scrambled payload and unscrambled headers, analyzing the unscrambled headers and determining at least one trick mode parameter.

Further in accordance with a preferred embodiment of the present invention the analyzing step includes analyzing only the unscrambled headers.

There is also provided in accordance with another preferred embodiment of the present invention apparatus for processing a data stream including a data stream receiver operative to receive a transport stream (TS), TS storage apparatus operative to store at least a portion of the TS, the at least a portion of the TS having a beginning and including a plurality of TS packets, candidate determining apparatus operative to determine, from among the plurality of TS packets, at least one TS packet including a candidate access point, candidate offset storage apparatus operative to store in an index store a byte offset of the candidate access point, and arrival time storage apparatus operative to store in the index store a plurality of indications of byte offset, each byte offset being associated with an arrival time of a received TS packet.

There is also provided in accordance with still another preferred embodiment of the present invention apparatus for processing a data stream including presentation determining apparatus operative to determine a desired presentation time of a point in the data stream to be accessed, arrival determining apparatus operative to determine an arrival time associated with the desired presentation time, and position determining apparatus operative to determine a position of an access point closely temporally associated with the arrival time.

There is also provided in accordance with yet another preferred embodiment of the present invention apparatus for analyzing a data stream including receiving apparatus operative to receive an MPEG data stream including a transport stream (TS), the TS including a scrambled payload and unscrambled headers, analyzing apparatus operative to analyze the unscrambled headers and to determine at least one trick mode parameter.

BRIEF DESCRIPTION OF THE DRAWINGS

The present invention will be understood and appreciated more fully from the following detailed description, taken in conjunction with the drawings in which:

FIG. 2 is a simplified partly pictorial, partly block diagram illustration of a preferred implementation of a portion of the system of FIG. 1;

FIG. 3 is a simplified flowchart illustration of a preferred method of operation of the system of FIG. 1;

DETAILED DESCRIPTION OF A PREFERRED EMBODIMENT

Figure 1:
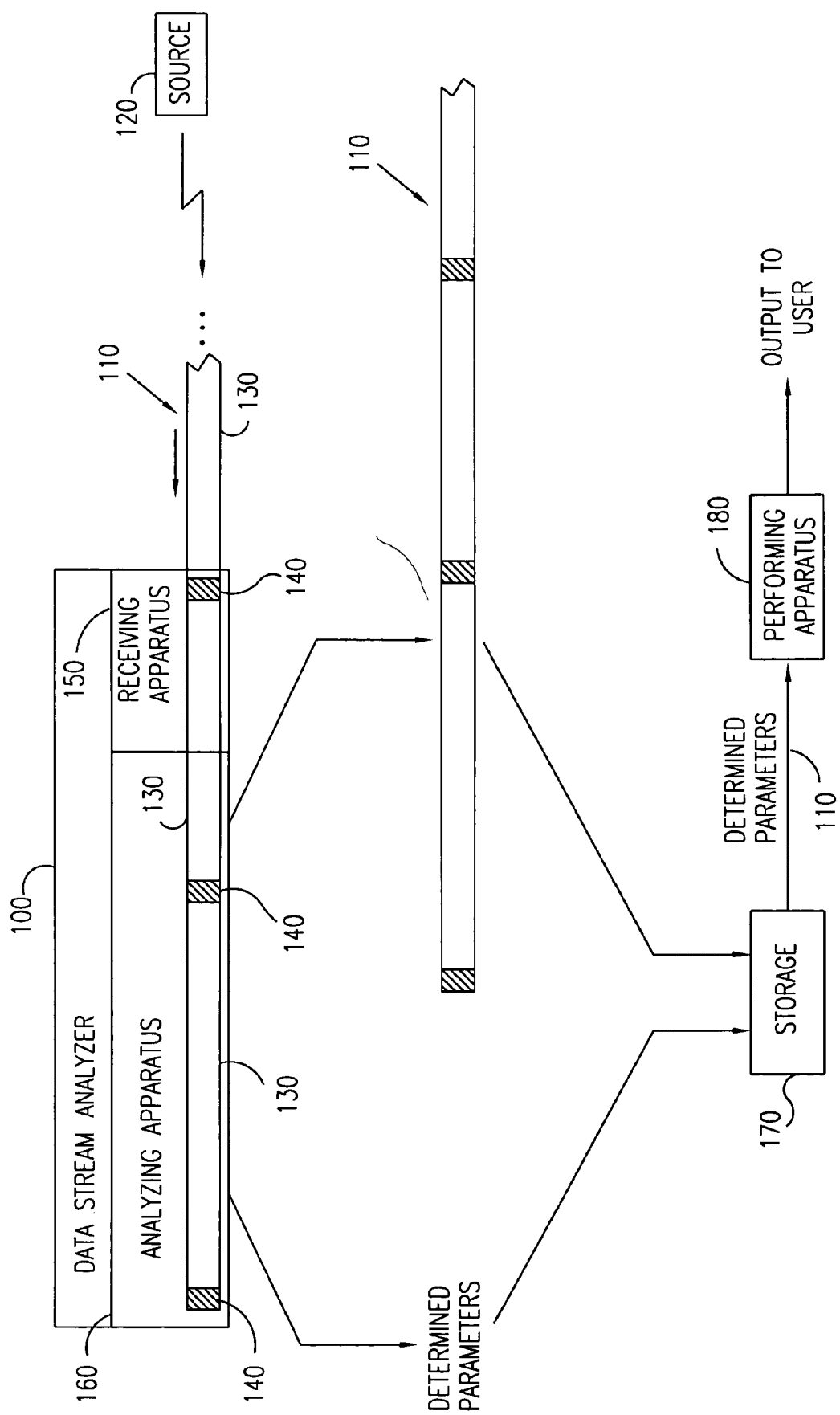
FIG. 1 is a simplified partly pictorial, partly block diagram illustration of a system for processing a data stream, the system being constructed and operative in accordance with a preferred embodiment of the present invention.

Reference is now made to FIG. 1 which is a simplified partly pictorial, partly block diagram illustration of a system for processing a data stream, the system being constructed and operative in accordance with a preferred embodiment of the present invention.

The system of FIG. 1 comprises a data stream analyzer 100, which is preferably operative, as described more fully below, to receive a data stream 110 comprising an at least partially scrambled data stream and to determine therefrom at least one parameter, preferably comprising at least one trick mode parameter, directly from the data stream. A trick mode parameter is generally used in the description below by way of example only, without intent to limit the generality of the present invention; it is appreciated that other appropriate data stream parameters, including but not limited to playback parameters, may also be used.

Preferably, the determination of the at least one trick mode parameter is based, at least in part, on a non-scrambled portion of the data stream. Preferably, the data stream analyzer 100 is implemented in an appropriate combination of hardware and software, as is well known in the art.

The system of FIG. 1 also comprises a source 120, the source 120 preferably comprising any appropriate data source capable of producing and transmitting the data stream 110. It is appreciated that other elements of the system of FIG. 1, excluding the source 120, comprise a subcombination comprising an alternative preferred embodiment of the present invention. The source 120 may comprise a conventional source of the data stream 110 such as, for example, a conventional television head end system, as is well known in the art.

The data stream 110 preferably comprises a plurality of scrambled portions 130 and a plurality of unscrambled portions 140. Data streams comprising a plurality of scrambled portions and a plurality of unscrambled portions are well known in the art and are known, for example, from the MPEG-2 standard mentioned above. In the case of the MPEG-2 standard, in the transport stream (TS) a 4 byte unscrambled header portion is followed by a 184 byte scrambled data portion. It will be appreciated by persons skilled in the art that the MPEG-2 protocol is a layered protocol, and that the structure of the transport stream need not reflect the structure of underlying data, such as a video stream. The example of the MPEG-2 standard is intended, throughout the present specification, as an example only, without intending to limit the generality of the present invention.

The term "transport layer", as used throughout the present specification and claims, is used to refer to the MPEG-2 TS and to any similarly functioning component of any other data stream mechanism; for example, and without limiting the generality of the foregoing, the following are examples of transport layers within the meaning of the previous definition: IP, TCP, and ATM. In order to further clarify the definition of transport layer, the term "transport layer" excludes, for example, the MPEG-2 PES layer, video layer, and audio layer.

The data stream analyzer 100 preferably comprises receiving apparatus 150, which may comprise any appropriate apparatus operative to receive the data stream 110, as is well known in the art.

The data stream analyzer 100 also comprises analyzing apparatus 160. The analyzing apparatus 160 is preferably operative, as described in more detail below, to analyze at least a portion of the data stream 110 and to determine therefrom at least one trick mode parameter. The terms "parameter" and "trick mode parameter" are used herein as described above. Preferably, the at least a portion of the data stream 110 analyzed by the analyzing apparatus 160 includes at least some of the plurality of unscrambled portions 140.

The system of FIG. 1 also preferably comprises storage apparatus 170, which is preferably operative to store information provided for storage by the analyzing apparatus 160. The storage apparatus may comprise any appropriate storage apparatus such as, for example, a computer disk or an array of computer disks controlled by an appropriate controller. The particular choice of computer disk or disks will partly depend on the size of the data stream 110 which is to be stored therein, as described below. It is also appreciated that the storage apparatus 170 may comprise a plurality of storage sub-units (not shown).

The system of FIG. 1 also comprises performing apparatus 180, which is operative to receive data stored in the storage apparatus 170, the data preferably comprising the determined parameters and the data stream 110, and to perform a trick mode on the data stream 110 based, at least in part, on the determined parameters. The performing apparatus 180 is also preferably operative to present an output, typically comprising an unscrambled data stream, to a user of the system of FIG. 1. It is appreciated that a subcombination of the elements of the system of FIG. 1, without the performing apparatus 180, comprises an alternative preferred embodiment of the present invention.

The operation of the system of FIG. 1 is now briefly described. The data stream 110 is preferably received from the source 120 by the receiving apparatus 150. As the data stream 110 is received, the data stream 110 is preferably passed to the analyzing apparatus 160. The analyzing apparatus 160 is operative, preferably as described below in more detail with reference to FIG. 2, to determine at least one parameter, typically comprising a plurality of parameters, each parameter preferably comprising a trick mode parameter, from the data stream 110. Preferably, the determination is made based, at least in part, on the plurality of unscrambled portions 140.

The determined parameters are preferably sent to the storage apparatus 170 for storage and later use. The data stream 110 is also preferably sent to the storage apparatus 170 for storage and later use. Preferably, the later use comprises use by the performing apparatus 180, as described above.

Reference is now made to FIG. 2, which is a simplified partly pictorial, partly block diagram illustration of a preferred implementation of a portion of the system of FIG. 1. The apparatus of FIG. 2 comprises the analyzing apparatus 160 of FIG. 1.

The analyzing apparatus 160 preferably comprises trick mode determining apparatus 190. The trick mode determining apparatus 190 is preferably operative to receive the plurality of unscrambled data portions 140 and to determine therefrom the determined parameters, as described above. As described further below, the determined parameters may preferably include index information useful for determining one or more trick mode parameters. A preferred method of operation of the trick mode determining apparatus 190 is described below with reference to FIGS. 3–5.

Reference is now made to FIG. 3, which is a simplified flowchart illustration of a preferred method of operation of the system of FIG. 1. The method of FIG. 3 preferably comprises the following steps:

An index to the data stream is built (step 200); for example, the index may be built by the trick mode determining apparatus of FIG. 2, with the determined parameters comprising the index. Preferably, step 200 includes storing the index for later use. It is appreciated that the determined parameter may comprise a heuristic parameter, that is, a parameter which aids in solving the problem of performing a trick mode, even though the parameter may not provide a perfect solution.

A trick mode is requested, typically based on a stored data stream and typically at a time later than a time at which step 200 is carried out. When the trick mode is to be performed, a trick mode parameter is determined (step 210). The trick mode parameter is preferably determined based, at least in part, on the index built in step 200. It is appreciated, however, that various implementations of the method of FIG. 3 are possible, and that additional information useful in determining a trick mode parameter may alternatively be stored in step 200. The trick mode parameter may comprise any suitable parameter useful in performing a trick mode; typically, the trick mode parameter comprises an indication of a location in an at least partially scrambled data stream at which descrambling and playback are to begin or to continue.

A trick mode is performed based, at least in part, on the trick mode parameter (step 220). For example, in the case of a fast forward trick mode, only certain frames might be played back in order to produce the fast forward trick mode. In the example of MPEG-2, which is not meant to be limiting, in a preferred embodiment only I-frames, which in MPEG-2 represent complete frames as opposed to a difference between frames, might be played back. It is appreciated that, in MPEG-2, an I-frame can be decoded without reference to any other frame. In such a case, as described more fully below, the trick mode parameter might represent a location in the data stream at which an I-frame is believed to be found.

Figure 4:
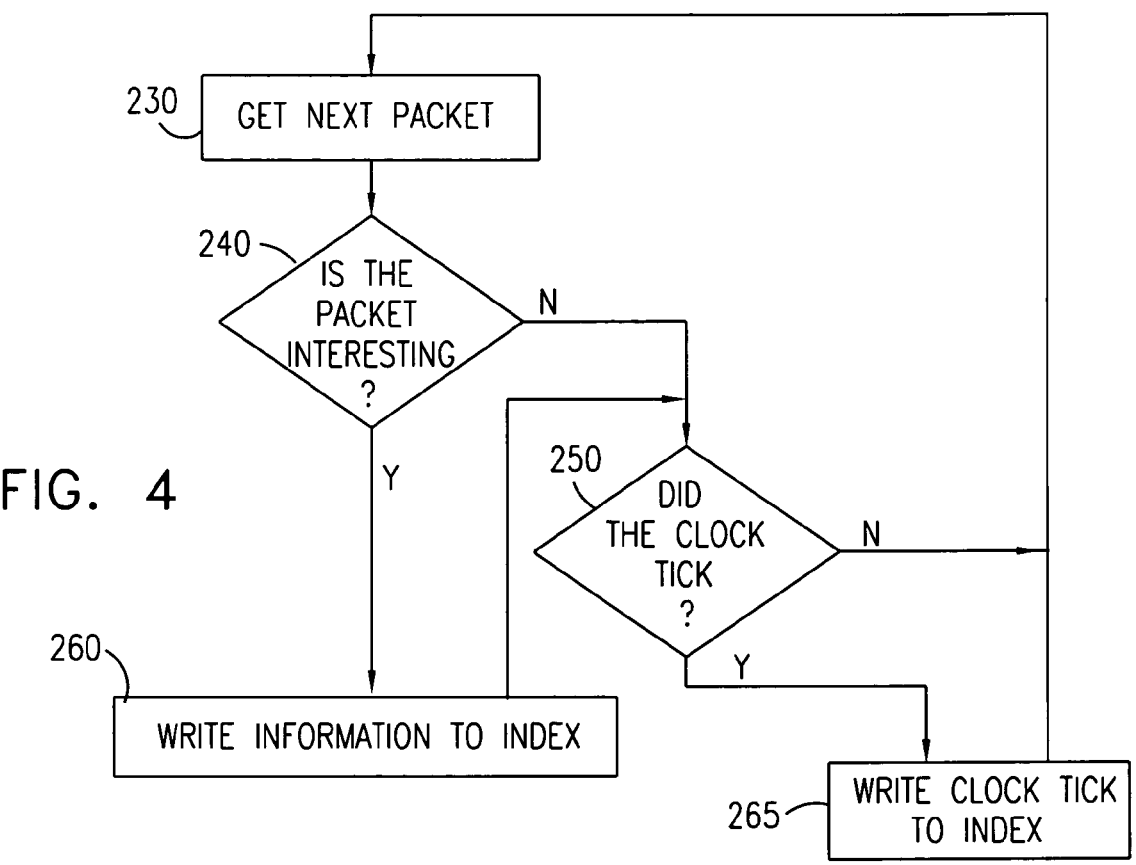
FIG. 4 is a simplified flowchart illustration of a preferred implementation a portion of the method of FIG. 3.

Reference is now made to FIG. 4, which is a simplified flowchart illustration of a preferred implementation of step 200 of FIG. 3. The method of FIG. 4 is directed to an example of a data stream comprising packets, as is well known in the art; persons skilled in the art will appreciate that the method of FIG. 4 may be modified for use with other data streams.

Persons skilled in the art will also appreciate that the method of FIG. 4 omits steps, such as initialization steps, which a person skilled in the art could provide. Persons skilled in the art will also appreciated that the method of FIG. 4 preferably operates quickly and efficiently in order to process a data stream in real time; therefore, it will be appreciated that a dedicated hardware implementation of apparatus for carrying out the method of FIG. 4, such as an application specific integrated circuit (ASIC) implementation or another appropriate hardware implementation, is preferred.

The method of FIG. 4 preferably comprises the following steps:

Get the next packet in the data stream (step 230); the next packet in the data stream is now considered the current packet. A check is made as to whether the current packet is interesting (step 240). It is appreciated that an appropriate definition of "interesting" is chosen in step 240 according to the particular type of data stream being processed and the particular type of index being built by the method of FIG. 4. By way of example only and without limiting the generality of the foregoing, the example of a partially scrambled MPEG-2 data stream is now considered.

In the case of a partially scrambled MPEG-2 data stream, it may by interesting to find a packet comprising the beginning of an I-frame; as described above, I-frames may be useful in performing trick modes. In an MPEG-2 system, as is well known, a transport stream (TS) packet includes a header, the header typically being unscrambled in a partially scrambled data stream. According to the MPEG-2 standard, the TS header includes a bit called payload_unit_start_indicator (pusi) to indicate that a PES packet is comprised in the present TS packet; the PES header, known as PES_hdr, is known to begin at the beginning of the TS packet payload.

Furthermore, it is believed by the inventors that in some manufacturer-based MEPG-2 conventions, such as that used in the Tandberg NDS System 3000 encoder, commercially available from Tandberg NDS Ltd. in the United Kingdom, only one PES_hdr is used for each group of pictures (GOP) beginning with an I-frame; in such a case, the pusi bit is a good indicator of the presence of an I-frame. It is appreciated that, in other manufacturer-based MPEG-2 conventions, such as those of ATSC and Tandberg NDS System 5000 encoders, a PES_hdr is inserted before each picture_hdr; in such a case, the pusi bit provides only a heuristic indication of the possible presence of an I-frame. In any case, the pusi bit in MPEG-2 comprises an example of an indication of an interesting TS packet. It is appreciated, however, that the MPEG-2 standard does not require any correspondence such as that discussed above.

The following are examples of attributes that might make a packet interesting, in the context of step 240:

standard TS header fields, which include the pusi bit as described above;

ECMs which may, for example, designate a scrambling polarity change;

EMMs;

MPEG-defined Adaptation Field (AF) fields, such as PCR and random access indicator;

private data field within the AF;

SI private tables, for which an external synchronization mechanism might be needed to achieve the required precision;

private descriptors in existing standard tables;

private streams, such as a private PES stream with associated PTS; and visible fields in partially scrambled streams.

A further example according to a particular type of data stream being processed and the particular type of index being built by the method of FIG. 4 is now described by way of example only and without limiting the generality of the foregoing, the example described relating to, for example, an ATSC type data stream as mentioned above.

In the case of an ATSC type data stream, the pusi typically indicates any type of frame and not necessarily an I-frame. In one preferred mode of operation, all pusi, or a subset thereof chosen according to an appropriate predefined rule, may be taken to be access point candidates. In another preferred mode of operation, advantage may be taken of the fact that, in many cases, I-frames are larger, that is, contain more bits, than other frames, typically by a factor of between approximately 3 and approximately 10. It is thus appreciated that, by analyzing the number of bits between adjacent pusi, the likely location of an access point can be determined more accurately as a pusi which is followed by a relatively large number of bits until the next pusi.

It is appreciated that the method described immediately above is heuristic in that certain conditions, such as scene changes and statistical multiplexing, may cause a particular P-frame or B-frame to include more bits than a nearby I-frame.

If the packet is found to be interesting in step 240, appropriate information is written to an index (step 260). For example, information written to the index may comprise a location within the data stream and an indication of the type of location found, such as a possible I-frame location.

If the packet is not found to be interesting in step 240, or after step 260, a check is made as to whether a clock has ticked; that is, whether a predefined interval of time, typically approximately 0.5 seconds, has passed (step 250). If the clock has ticked, processing preferably proceeds with step 265; otherwise, processing preferably proceeds with step 230. In step 265, clock tick information is written to the index, and processing preferably proceeds with step 230.

The concept of clock ticks is well known in the art. The purpose of the clock tick in the method of FIG. 4 is to provide arrival time information in the index. As previously stated, there is believed to be a close correlation, in many cases, between arrival time and presentation time; arrival time can thus be important for jumping to a particular location in the data stream based on presentation time. For example, in a case where, upon playback, it will be desirable to jump to a particular presentation time that represents, for example, the presentation of a given news story, the following example partial index structure, which may be created by the method of FIG. 4, may be helpful:

| packet number | time | type |
| --- | --- | --- |
| a | [none] | candidate access point, such as candidate I-frame point |
| b | [none] | point of change of scrambling parameters |
| c | t | clock tick (arrival time) | where a, b, and c represent packet numbers, and t represents an arrival time.

Figure 5:
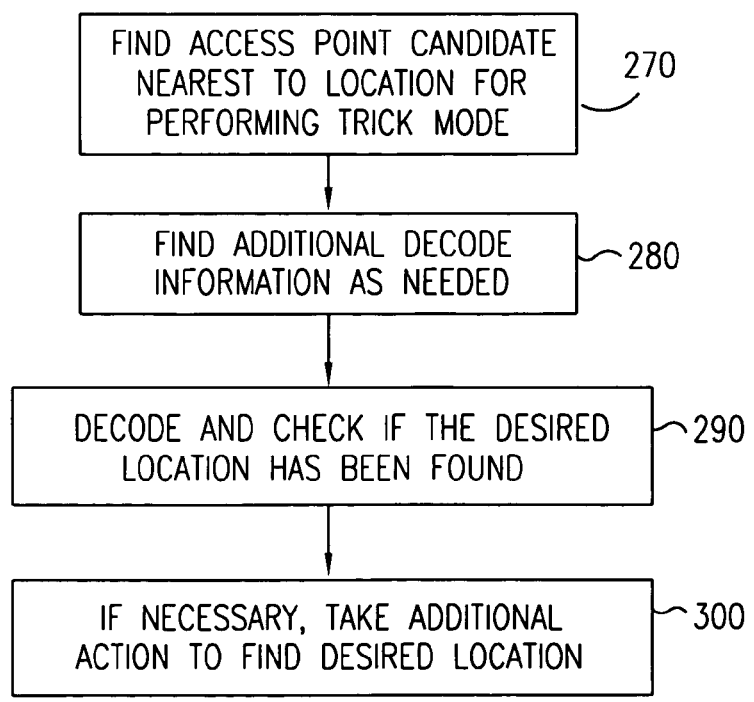
FIG. 5 is a simplified flowchart illustration of a preferred implementation another portion of the method of FIG. 3

Reference is now made to FIG. 5, which is a simplified flowchart illustration of a preferred method of operation of step 210 of FIG. 3. The method of FIG. 5 preferably comprises the following steps:

An access point candidate is found, the candidate preferably comprising the nearest candidate preceding the location at which a trick mode is to be performed (step 270). The candidate is preferably found based, at least in part, on the index described above with reference to FIG. 4. Generally, the purpose of step 270 is to find an access point candidate, near the location at which the trick mode is to be performed and preferably before said location, "before" being measured in a direction in which the data stream is being traversed in order to perform the trick mode.

Additional decode information is found as needed (step 280). One example of additional decode information is an ECM, which would typically be found in another, associated stream, as is well known in the art.

Decoding takes place at the access point candidate, and a check is made as to whether a desired location has been found (step 290). For example, a check is made as to whether an I-frame has been found.

In a case where a desired location has not been found, additional action is taken to find the desired location (step 300). The additional action may comprise, for example, continuing to decode from the access point candidate, or jumping to a next access point candidate. A decision on the particular additional action to be taken may depend, for example, on how close access points are to each other, or on other appropriate factors.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for processing a data stream comprising:
   receiving a transport stream (TS);
   storing at least a portion of the TS, said at least a portion of the TS having a beginning and comprising a plurality of TS packets;
   determining, from among the plurality of TS packets, at least one TS packet comprising a candidate access point;
   storing in an index store a byte offset of the candidate access point; and
   storing in the index store a plurality of indications of byte offset, each byte offset being associated with an arrival time of a received TS packet.

2. A method according to claim 1 and wherein the storing indications of byte offset step comprises repeatedly storing in the index store, at predefined intervals of time, a byte offset of a recently received TS packet.

3. A method according to claim 1 and wherein the byte offset of the candidate access point and the byte offset of the recently received TS packet each comprises a byte offset relative to the beginning.

4. A method according to claim 1 and wherein the TS comprises an MPEG-2 TS.

5. A method according to claim 1 and wherein the TS comprises an at least partially scrambled TS.

6. A method according to claim 1 and wherein the TS comprises a video stream.

7. A method according to claim 1 and wherein the TS comprises an audio stream.

8. A method according to claim 1 and also comprising:
   utilizing the index for accessing at least a part of the portion of the TS.

9. A method according to claim 8 and wherein the utilizing step comprises:
   determining a desired presentation time of a point to be accessed, said point being associated with the at least a part of the portion of the TS;
   determining an arrival time associated with the desired presentation time; and
   determining, based at least in part on at least one byte offset stored in the index store, a byte offset of an access point closely temporally associated with the arrival time.

10. A method according to claim 9 and wherein said determining a desired presentation time comprises determining a desired presentation time based on at least one of the following: at least one desired characteristic of a presentation mode; and at least one random access characteristic.

11. A method according to claim 9 and wherein said determining an arrival time comprises determining an arrival time based on the desired presentation time and on a predetermined relationship between arrival time and presentation time.

12. A method according to claim 9 and wherein the utilizing step also comprises:
   decoding the at least a part of the portion of the TS for presentation beginning from the access point.

13. A method according to claim 9 and wherein the utilizing step also comprises:
   descrambling the at least a part of the portion of the TS for presentation beginning from the access point.

14. A method according to claim 9 and wherein the access point comprises a packet comprising at least one of the following:

a packet having a bit turned on in a standard TS header field;
an ECM;
an EMM;
an Adaptation Field (AF) field;
a private data field within the AF;
an SI private table;
a private descriptor; a private stream; and
a visible field in a partially scrambled stream.

15. A method according to claim 14 and wherein the private stream comprises a private PES stream with associated PTS.

16. A method according to claim 14 and wherein the packet having a bit turned on comprises a packet having a payload_unit_start_indicator (pusi) bit turned on.

17. A method according to claim 14 and wherein the AF comprises at least one of the following: a PCR; and a random access indicator.

18. A method for processing a data stream comprising:
determining a desired presentation time of a point in the data stream to be accessed;
determining an arrival time associated with the desired presentation time; and
determining a position of an access point closely temporally associated with the arrival time.

19. Apparatus for processing a data stream comprising:
a data stream receiver operative to receive a transport stream (TS);
TS storage apparatus operative to store at least a portion of the TS, said at least a portion of the TS having a beginning and comprising a plurality of TS packets;
candidate determining apparatus operative to determine, from among the plurality of TS packets, at least one TS packet comprising a candidate access point;
candidate offset storage apparatus operative to store in an index store a byte offset of the candidate access point; and
arrival time storage apparatus operative to store in the index store a plurality of indications of byte offset, each byte offset being associated with an arrival time of a received TS packet.

20. Apparatus for processing a data stream comprising:
presentation determining apparatus operative to determine a desired presentation time of a point in the data stream to be accessed;
arrival determining apparatus operative to determine an arrival time associated with the desired presentation time; and
position determining apparatus operative to determine a position of an access point closely temporally associated with the arrival time.

\* \* \* \* \*